US008411334B2

(12) United States Patent
Ogawa

(10) Patent No.: US 8,411,334 B2
(45) Date of Patent: Apr. 2, 2013

(54) PAPER-SHEET RECOGNITION APPARATUS

(75) Inventor: Kazuhito Ogawa, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 784 days.

(21) Appl. No.: 12/653,027

(22) Filed: Dec. 7, 2009

(65) Prior Publication Data

US 2010/0091345 A1 Apr. 15, 2010

Related U.S. Application Data

(63) Continuation of application No. PCT/JP2007/061949, filed on Jun. 7, 2007.

(51) Int. Cl.
*H04N 1/04* (2006.01)

(52) U.S. Cl. ......... 358/482; 358/483; 358/474; 358/497

(58) Field of Classification Search .................. 358/482, 358/483, 474, 497, 498
See application file for complete search history.

(56) References Cited

U.S. PATENT DOCUMENTS 6,931,148 B2 * 8/2005 Mukai ........................... 382/135
2002/0039206 A1 4/2002 Mukai ........................... 358/488
2005/0093037 A1 * 5/2005 Yonezawa et al. ............ 257/292

FOREIGN PATENT DOCUMENTS

JP 09-077292 3/1997
JP 2000-318873 11/2000
JP 2003-002502 1/2003
JP 2004-317463 11/2004

OTHER PUBLICATIONS

International Search Report (2 pages—dated Jul. 10, 2007).

* cited by examiner

*Primary Examiner* — Houshang Safaipour
(74) *Attorney, Agent, or Firm* — Renner, Kenner, Greive, Bobak, Taylor & Weber

(57) ABSTRACT

A paper-sheet recognition apparatus includes a base plate; and one or a plurality of line sensors engaged in the base plate. An engaging portion between the line sensor and the base plate has a concave-convex engaging structure in which a concave-convex portion provided in the line sensor and a concave-convex portion provided in the base plate are engaged with each other, a convex portion of the concave-convex portion provided in the line sensor has the same size as a convex portion of the concave-convex portion provided in the base plate in the direction perpendicular to the paper-sheet transport direction, each of the concave-convex portions is formed having an inclined surface that extends downwardly from a horizontal plane, and edges of end faces of the concave-convex portions and boundaries between a horizontal plane of the base plate and the inclined surfaces of the concave-convex portions are round chamfered.

8 Claims, 6 Drawing Sheets

PAPER-SHEET RECOGNITION APPARATUS

CROSS-REFERENCE TO RELATED APPLICATIONS

This application is a continuation of PCT international application Ser. No. PCT/JP2007/061949 filed on Jun. 7, 2007 which designates the United States, the entire contents of which are incorporated herein by reference.

BACKGROUND OF THE INVENTION

1. Field of the Invention

The present invention relates to a paper-sheet recognition apparatus that prevents from causing a jam of a paper sheet and a tear therein during its transportation, and more particularly, to a paper-sheet recognition apparatus with an improved configuration of an engaging portion between a base plate and a sensor, or the like, that detects a feature of a paper sheet.

2. Description of the Related Art

A paper-sheet recognition apparatus is used to recognize a paper sheet by using a sensor such as an optical sensor that detects optical features forming a light and dark pattern or a transmitted light pattern of a paper sheet or a magnetic sensor that detects magnetic features forming a magnetic pattern formed by components of ink printed on a paper sheet. The paper-sheet recognition apparatus is used by being widely mounted on a variety of laborsaving devices such as a banknote handling machine, an automatic vending machine, an automatic money exchanger, and a game-medium lending machine for a game machine. The type of the sensor includes a line sensor and a point sensor depending on a configuration of the sensor.

As an example of paper-sheet recognition apparatuses using the line sensor, a paper-sheet recognition apparatus as shown in FIG. 1 is disclosed in Japanese Patent Application Laid-open No. 2004-317463. A magnetic sensor 102 of a paper-sheet recognition apparatus 101 is the line sensor, which recognizes banknotes and securities printed using magnetic ink or the like. Stored in a housing 103 of the magnetic sensor 102 is a single or a plurality of magnetic detection devices. Moreover, the magnetic sensor 102 is provided with a hard metal cover 104 that covers a magnetic detection surface of the housing 103. The magnetic sensor 102 is supported by a stage 105. Formed in the stage 105 is a single or a plurality of convex portions 106 each of which has a shape protruding toward the side of the magnetic sensor 102, and each of the convex portions 106 is engaged with each of concave portions formed along a slope portion 104*b* of the cover 104 that is mounted on the magnetic sensor 102.

Consequently, a banknote M transported from one side (left-hand side in the figure) of the stage 105 along a transport direction X passes over the convex portions 106 as it is, and this does not cause the banknote M to enter into a space 107 between the magnetic sensor 102 and the stage 105 which are separately arranged from each other. Therefore, the banknote M during transportation is prevented from being jammed (paper jam).

A schematic view of a point sensor engaged in a base plate when the point sensor is used in the paper-sheet recognition apparatus is shown in FIGS. 2A and 2B. FIGS. 2A is a cross section of a point sensor cover 112 engaged in a base plate 111, and FIG. 2B is a perspective view representing a detection surface 113 of the point sensor cover 112. The point sensor is covered with the point sensor cover 112. The point sensor cover 112 has an end portion formed into a truncated conical shape, and the detection surface 113 is formed into a circular shape. The base plate 111 on which the paper sheet is placed and transported has a circular hole in which the point sensor cover 112 fits. As shown in FIG. 2A, a C-chamfering process is performed on an area of the base plate 111 around the point sensor cover 112.

In a transport path before and behind the paper-sheet recognition apparatus, a paper sheet is transported in a state in which it is gripped by transportation belts or transportation rollers, while inside the paper-sheet recognition apparatus, the paper sheet cannot be securely gripped by the transportation belts and/or the transportation rollers for transportation. Therefore, inside the paper sheet recognition apparatus, the paper sheet swings in a direction deviating from a fixed path, and the paper sheet is caught on a paper-sheet recognition sensor, which causes a jam and a tear of the paper sheet.

In the paper-sheet recognition apparatus described in Japanese Patent Application Laid-open No. 2004-317463, in order to prevent a banknote during transportation from being jammed, a convex portion that protrudes toward the magnetic sensor side is formed on the stage that supports the magnetic sensor, so that the convex portion is engaged with the concave portion formed in the cover of the magnetic sensor. However, the paper sheet recognition apparatus also has a problem that if there is a tiny tear in a banknote, because there is a space between the engaging portions, the banknote is thereby caught in the space between the convex portions, and therefore the jam of the banknote and the tear in the banknote during transportation cannot be perfectly prevented.

Moreover, in an example of using the point sensor in the paper-sheet recognition apparatus, there is also a problem that if there is a tiny tear in a paper sheet, the paper sheet may be caught in a space between the base plate 111 and the detection surface 113 of the point sensor, and therefore the jam of the paper sheet and the tear therein during transportation cannot be perfectly prevented.

SUMMARY OF THE INVENTION

The present invention has been made in view of the above problems, and the object of the present invention is to provide the paper-sheet recognition apparatus capable of more reliably prevent the paper sheet from being jammed and/or torn even if the paper sheet swings in the direction deviating from the fixed path inside the paper-sheet recognition apparatus.

A paper-sheet recognition apparatus according to an aspect of the invention includes a base plate; and one or a plurality of line sensors that are engaged in the base plate in a direction perpendicular to a paper-sheet transport direction and read data for a nearly whole area of a paper sheet. An engaging portion between the line sensor and the base plate has a concave-convex engaging structure in which a concave-convex portion provided in the line sensor and a concave-convex portion provided in the base plate are engaged with each other, a convex portion of the concave-convex portion provided in the line sensor has the same size as a convex portion of the concave-convex portion provided in the base plate in the direction perpendicular to the paper-sheet transport direction, each of the concave-convex portions is formed having an inclined surface that extends downwardly from a horizontal plane, and edges of end faces of the concave-convex portions and boundaries between a horizontal plane of the base plate and the inclined surfaces of the concave-convex portions are round chamfered.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The paper-sheet recognition apparatus according to the present invention has a concave-convex engaging structure in a portion where the line sensor for recognizing the paper sheet and the base plate are engaged with each other, to prevent a paper sheet during transportation from being jammed and/or torn, in the direction perpendicular to the transport direction of the paper sheet. If the sensor for recognizing the paper sheet is a point sensor, a diameter of a hole formed in the base plate side in which the point sensor is fitted is made smaller than a diameter of a cover of the point sensor, to thereby prevent the paper sheet during transportation from being jammed and/or torn. Moreover, guides for transport the paper sheet are provided in the front and the rear of the base plate, and claws each having a predetermined inclined surface are provided on end faces of the guides on the outside of the paper-sheet recognition apparatus, so that the paper sheet can be bidirectionally transported.

The embodiment of the present invention is explained below with reference to drawings.

Figure 1:
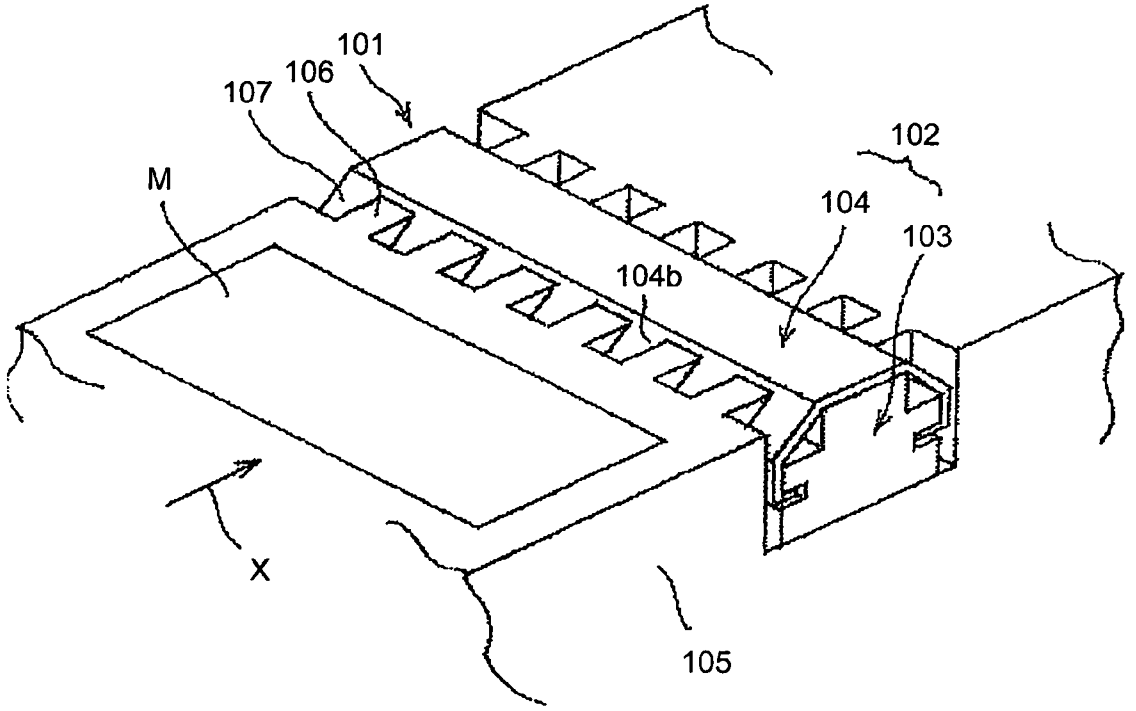
FIG. 1 is a perspective view representing an example of the conventional paper-sheet recognition apparatus provided with the line sensor.
Figure 2A:
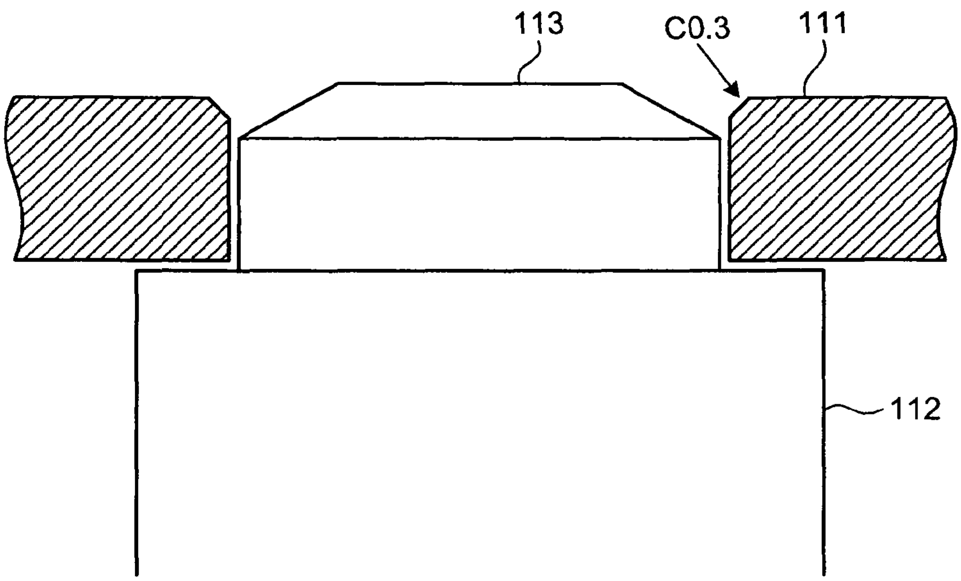
FIGS. 2A and 2B are schematic views representing the point sensor engaged in the conventional base plate.
Figure 2B:
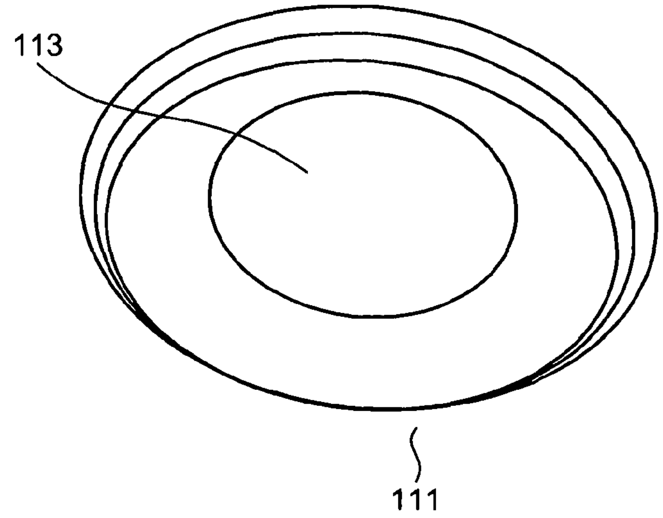
Figure 3:
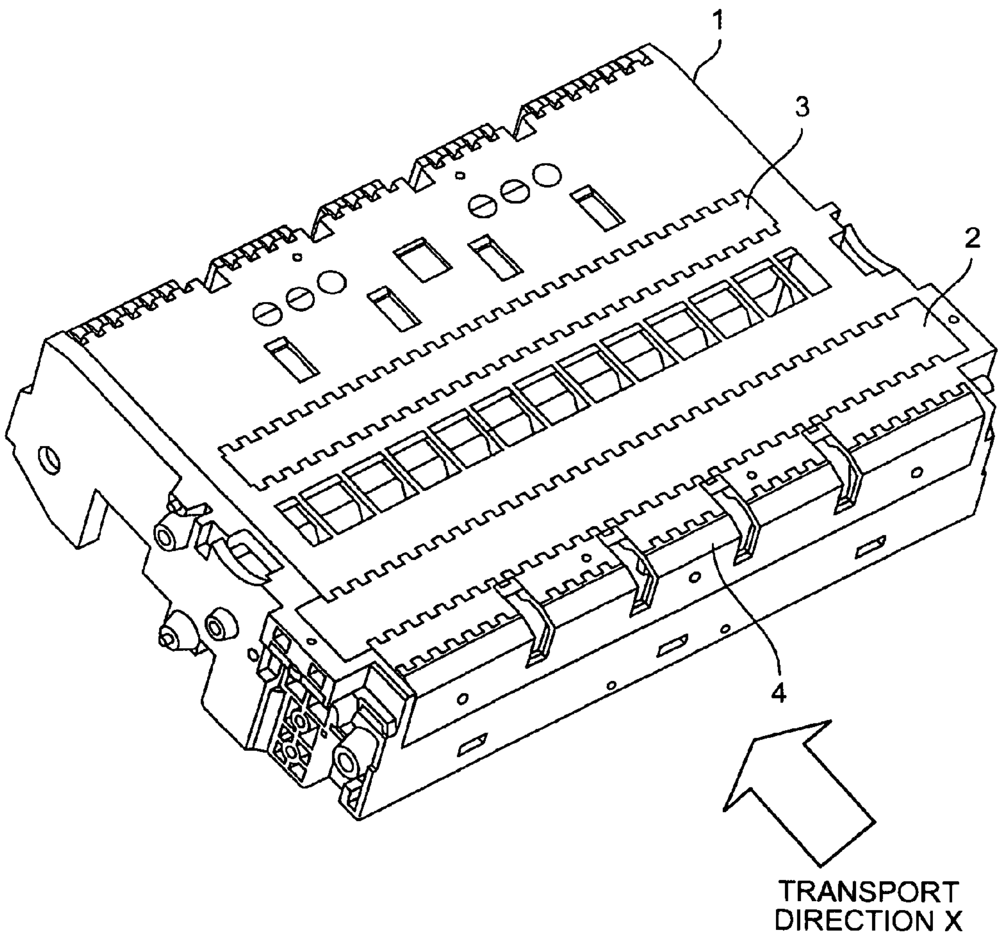
FIG. 3 is a perspective view representing one embodiment of a paper-sheet recognition apparatus according to the present invention.

FIG. 3 is a perspective view representing one embodiment of the paper-sheet recognition apparatus according to the present invention. When the paper sheet is to be transported on a base plate 1, the paper sheet is transported passing through a space between the base plate 1 and an opposed member. As shown in FIG. 3, the base plate 1 on which the paper sheet such as a banknote is transported in the transport direction X is provided with a line sensor 2 and a line sensor 3 which are sensors for recognizing a paper sheet. The line sensor 2 and the line sensor 3 are either one of a photo line sensor or a magnetic line sensor. The end face of the base plate 1 facing to a direction in which the paper sheet comes is provided with a guide 4 for transporting the paper sheet. In order to smoothly transport the paper sheet coming to the base plate 1, the guide 4 is formed having a predetermined inclined surface.

To prevent the paper sheet from being jammed and/or torn, engaging portions where the line sensor 2 and the line sensor 3 are engaged with the base plate 1 in a direction perpendicular to the transport direction of the paper sheet have concave-convex engaging structures. In order not to interfere with transportation of the paper sheet even if there are slight crease and tear of about 4 mm to 5 mm in the paper sheet, a pitch distance between the convex portions of the concave-convex portion is desirably set to about 5 mm to 10 mm, and a length of each protrusion in the transport direction is desirably set to 5 mm or less. The pitch distance between the convex portions of the concave-convex portion and the length of the protrusion in the transport direction are required to be set to a predetermined size or more according to a material to be used, in order to keep a constant strength.

Figure 4A:
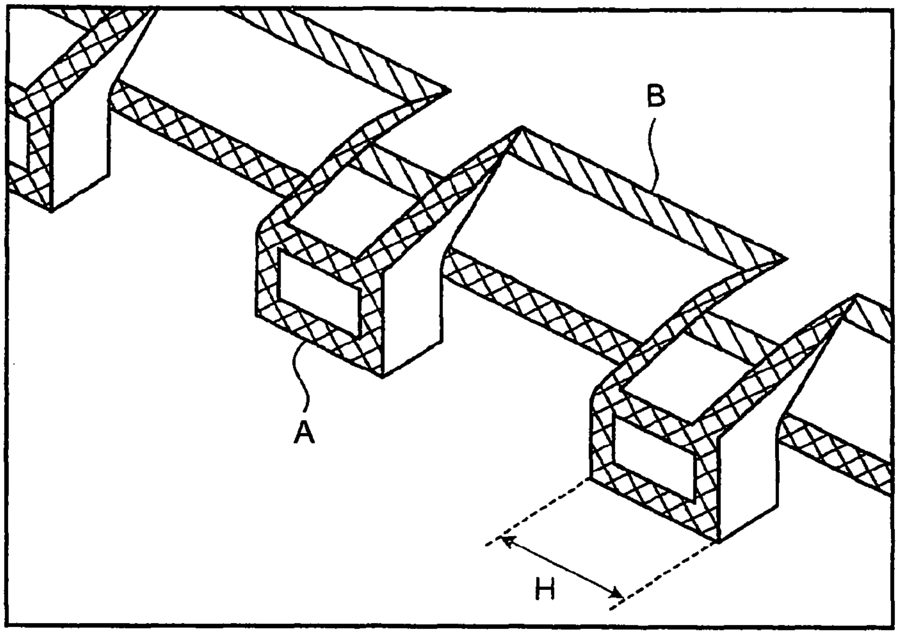
FIGS. 4A and 4B are enlarged perspective views of the concave-convex portions of the line sensor and the base plate.
Figure 4B:
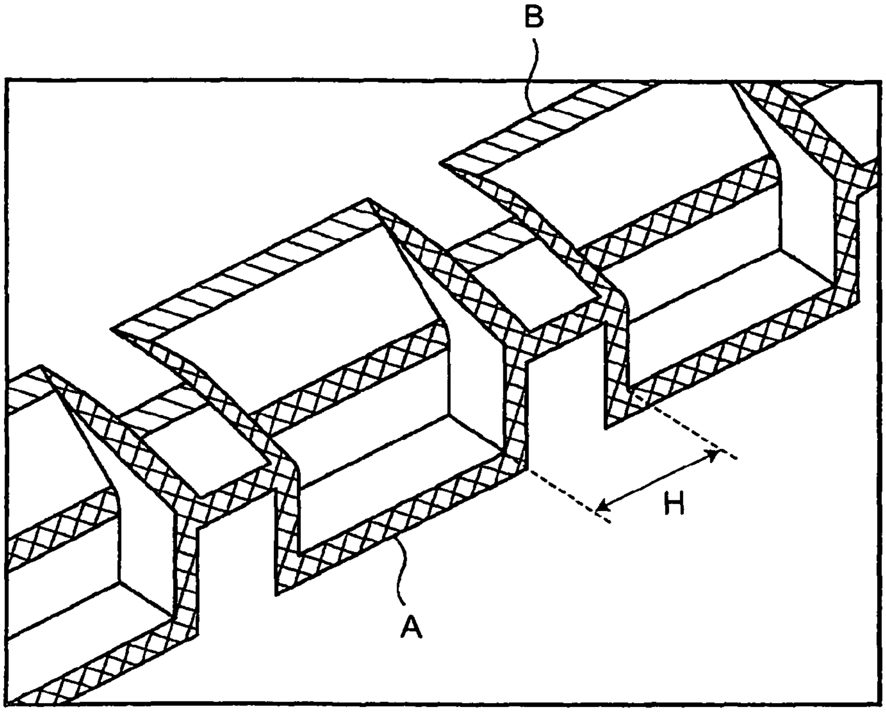

Schematic views in which the concave-convex portions of the line sensor and the base plate are enlarged are shown in FIGS. 4A and 4B. FIG. 4A represents a configuration of the concave-convex of the line sensor, and FIG. 4B represents a configuration of the concave-convex portion of the base plate. As shown in FIGS. 4A and 4B, the convex portions of the line sensor are configured to be fitted in the concave portions of the base plate, and the concave portions of the line sensor are configured to be fitted to the convex portions of the base plate. In the present embodiment, the pitch distance between the convex portions of the concave-convex portion is set to 6 mm, and a size H of the convex portion in the direction perpendicular to the transport direction is set to the same in the line sensor side and in the base plate side, that is, to 2.5 mm. Furthermore, there is provided a margin with a space of 0.5 mm between the convex portion of the line sensor and the convex portion of the base plate. As shown in FIGS. 4A and 4B, each of the concave-convex portions formed in the line sensor and in the base plate has a predetermined inclined surface that extends downwardly from the horizontal plane. The angle of the inclined surface relative to the horizontal plane can be desirably set to a range from 5 degrees to 20 degrees, and its optimal value is nearly 15 degrees. Moreover, portions indicated by A, i.e. edges of end faces of the concave-convex portions, and portions indicated by B that are equivalent to boundaries between the horizontal plane and the inclined surfaces of the concave-convex portions in FIGS. 4A and 4B are round chamfered. In the present embodiment, a radius of a round portion is set to 0.5 mm (R0.5) in A, and is set to 2 mm (R2) in B.

In the present embodiment, as shown in FIGS. 4A and 4B, the configuration of the concave-convex portion in the line sensor side and the configuration of the concave-convex portion in the base plate side are different from each other; however, the configuration of the concave-convex portion in the base plate side may be formed into the same configuration as that in the line sensor side shown in FIG. 4A.

Figure 5A:
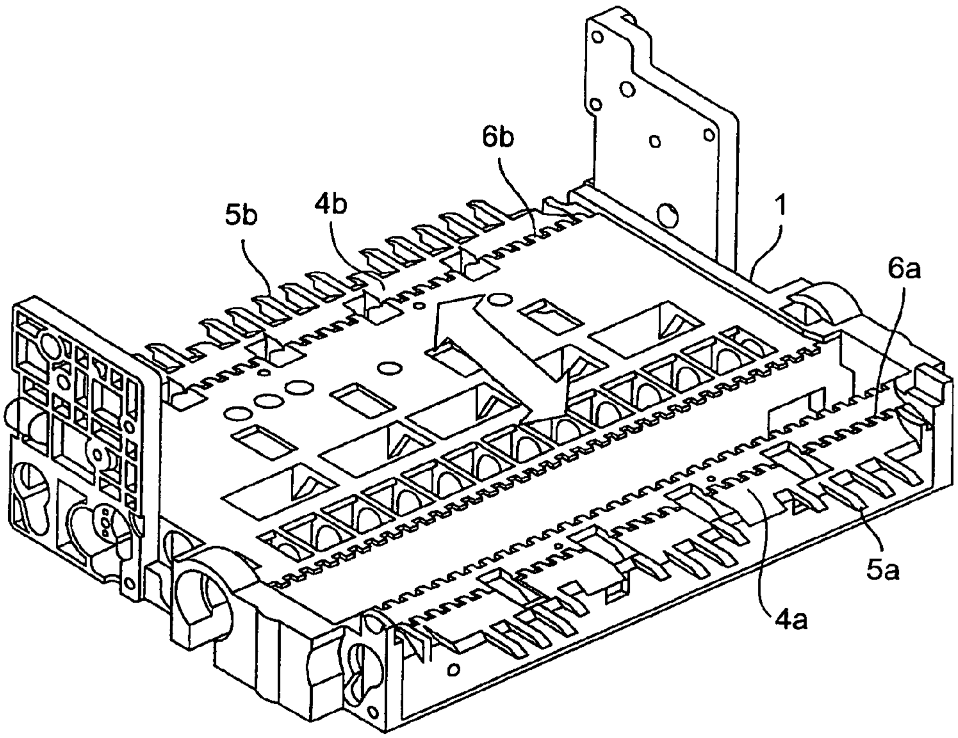
FIGS. 5A and 5B are perspective views representing an example of the paper-sheet recognition apparatus caused to support bidirectional transportation of the paper sheet.
Figure 5B:
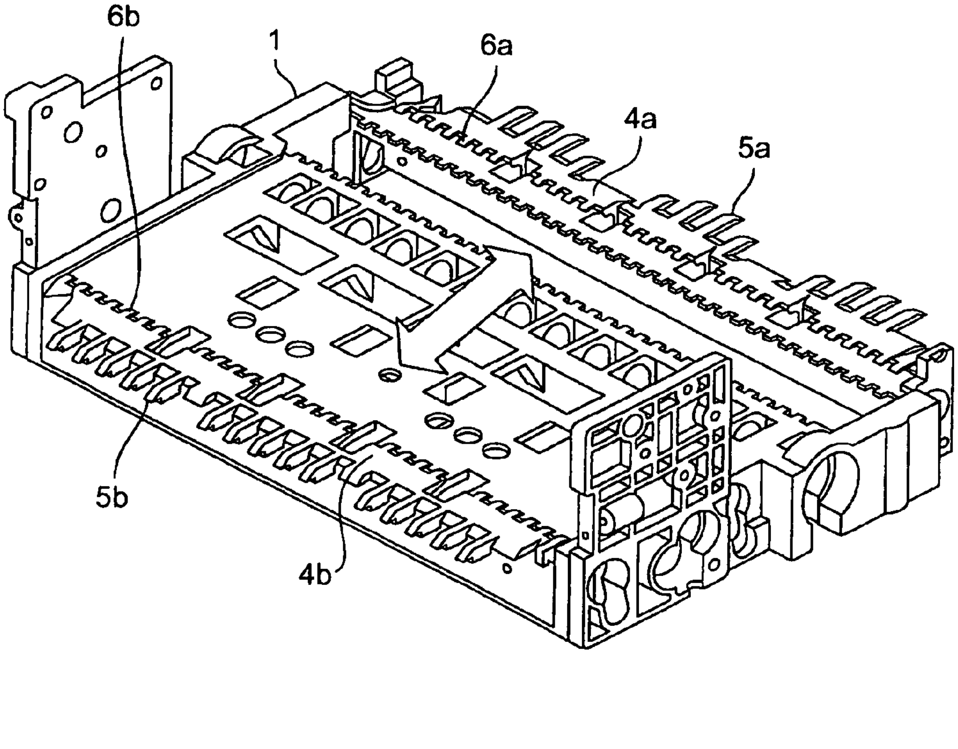

Guides for transporting the paper sheet are provided in the front and the rear end faces of the base plate 1 in the direction perpendicular to the transport direction, and a predetermined inclined surface is provided on each of the guides, so that the paper-sheet recognition apparatus can easily support bidirectional transportation of the paper sheet only by replacing the guide in the paper-sheet recognition apparatus that supports unidirectional transportation. FIGS. 5A and 5B represents an example of the paper-sheet recognition apparatus caused to support bidirectional transportation of the paper sheet by providing a front guide *4a* and a rear guide *4b* in the base plate 1. FIG. 5A is a perspective view of the paper-sheet recognition apparatus when the front guide *4a* is placed frontward, and FIG. 5B is a perspective view of the paper-sheet recognition apparatus when the rear guide *4b* is placed frontward. To transport the paper sheet, the front guide *4a* is provided with claws *5a* and the rear guide *4b* is provided with claws *5b*. Each of the claws *5a* is provided with a predetermined inclined surface in order to transport the paper sheet from the front guide *4a* toward the rear guide *4b*, and each of the claws

5b is also provided with a predetermined inclined surface in order to transport the paper sheet from the rear guide 4b toward the front guide 4a.

Furthermore, to prevent the paper sheet from being jammed and/or torn upon its transportation, an engaging portion between the front guide 4a and the base plate 1 has a concave-convex engaging structure 6a, and an engaging portion between the rear guide 4b and the base plate 1 has a concave-convex engaging structure 6b. In the concave-convex engaging structure 6a, as shown in FIGS. 5A and 5B, a concave-convex portion provided in the front end face of the base plate 1 and a concave-convex portion provided in end face of the guide 4a are engaged with each other. In the concave-convex engaging structure 6b, as shown in FIGS. 5A and 5B, a concave-convex portion provided in the rear end face of the base plate 1 and a concave-convex portion provided in end face of the guide 4b are engaged with each other. A pitch distance between the convex portions of the concave-convex engaging structures 6a and 6b is 5 mm to 10 mm and a length of each protrusion in the transport direction of the paper sheet is 2 mm to 5 mm, which are the same as these of the concave-convex portion in the engaging portion between the line sensor and the base plate. The size of the convex portion in the guide side and the size of the convex portion in the base plate side of the concave-convex engaging structure 6a and 6b in the direction perpendicular to the transport direction are the same as each other, and a margin with a predetermined distance is provided between the convex portion in the guide side and the convex portion in the base plate side. Similarly to the concave-convex engaging structure in the engaging portion between the line sensor and the base plate, each of the concave-convex portions in the concave-convex engaging structure 6a and 6b also has a predetermined inclined surface that extends in the transport direction and downwardly with respect to a transport path, and the angle of the inclined surface relative to the horizontal plane can be desirably set to a range from 5 degrees to 20 degrees, and its optimal value is nearly 15 degrees. Moreover, edges of each end face of the concave-convex portions in the concave-convex engaging structure 6a and 6b and to each boundary between the horizontal plane and the inclined surface of the concave-convex portions in the concave-convex engaging structure 6a and 6b are round chamfered.

In the examples of FIGS. 5A and 5B, the claws 5a provided in the front guide 4a are different in size, and the claws 5b provided in the rear guide 4b are of the same size. However, if the claws are formed having the predetermined inclined surface that extends in the transport direction and is inclined downwardly with respect to the horizontal plane, sizes and the arrangement of the claws can be changed appropriately depending on the purpose or the configuration of a junction with the transport path.

Figure 6A:
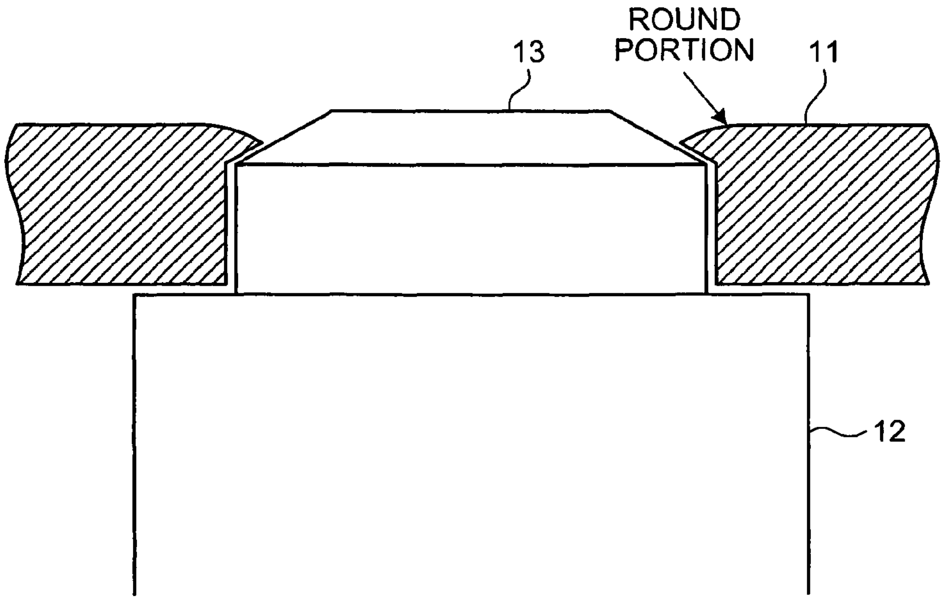
FIGS. 6A and 6B are schematic views representing another embodiment of the paper-sheet recognition apparatus according to the present invention.
Figure 6B:
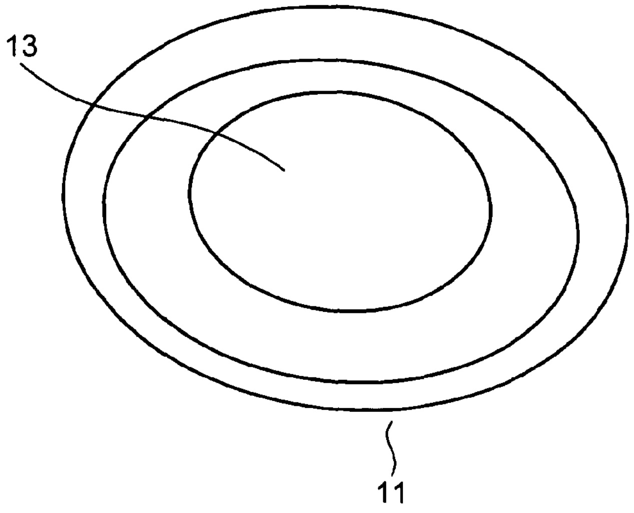

FIGS. 6A and 6B represent an embodiment of a case in which the point sensor is used as the sensor for recognizing the paper sheet in the paper-sheet recognition apparatus according to the present invention. FIG. 6A is a cross section of a point sensor cover 12 engaged in a base plate 11, and FIG. 6B is a schematic view representing a detection surface 13 of the point sensor cover 12. A point sensor is covered with the point sensor cover 12. As shown in FIGS. 6A and 6B, the detection surface 13 of the point sensor cover 12 is formed into a circular shape, and the end portion of the point sensor cover 12 is formed into a truncated conical shape. Provided in the base plate 11 on which the paper sheet is placed and transported is a circular hole in which the point sensor cover 12 is engaged. To prevent the paper sheet during transportation from being jammed and/or the paper sheet from being torn, the diameter of a rim of the hole of the base plate 11 in which the point sensor cover 12 is fitted is made smaller than the diameter of the point sensor cover 12 on the plane on which the paper sheet is transported, so as to be fitted to the diameter of the truncated conical shape of the end face of the point sensor cover 12. Moreover, as shown in FIG. 6A, an area of the base plate 11, around the point sensor cover 12, on the side to which the paper sheet is transported is round chamfered. In other words, the upper surface of the rim of the hole on the base plate 11, which faces to the transport path and by which the sensor cover 12 is caught, is formed having an round chamfered portion, as shown in FIG. 6A.

According to the paper-sheet recognition apparatus of the present invention, the engaging portion between the line sensor for recognizing the paper sheet and the base plate has the concave-convex engaging structure with a fine pitch to reduce the space as much as possible in which the paper sheet may be caught. Therefore, it is possible to deal with slight crease and tear of about 4 mm to 5 mm in the paper sheet during transportation, and to reliably prevent the paper sheet during transportation from being jammed and/or torn. When the sensor for recognizing the paper sheet is the point sensor, the diameter of the rim of the hole formed in the base plate side in which the point sensor cover is fitted is made smaller than the diameter of the point sensor cover to reduce the space as much as possible in which the paper sheet may be caught, which allows prevention of the paper sheet during transportation from being jammed and/or torn. Furthermore, the guides for transporting the paper sheet are provided in the front and the rear end faces of the base plate in the direction perpendicular to the transport direction, and each of the guides is formed having the predetermined inclined surface, which allows the paper-sheet recognition apparatus to support the bidirectional transportation of the paper sheet.

In the above-described embodiment, explanation was made for the case in which the transport path of the paper sheet is made on the upper surface of the base plate 1 disposed horizontally. However, even the case in which the transport path is made on the lower surface of the base plate 1 disposed horizontally, or the case in which the transport path is made on the surface of the base plate 1 disposed vertically may be applied to the present invention.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A paper-sheet recognition apparatus comprising:

a base plate; and one or a plurality of line sensors that are engaged in the base plate in a direction perpendicular to a paper-sheet transport direction and read data for a nearly whole area of a paper sheet, wherein an engaging portion between the line sensor and the base plate has a concave-convex engaging structure in which a concave-convex portion provided in the line sensor and a concave-convex portion provided in the base plate are engaged with each other, a convex portion of the concave-convex portion provided in the line sensor has the same size as a convex portion of the concave-convex portion provided in the base plate in the direction perpendicular to the paper-sheet transport direction, each of the concave-convex portions is formed having an inclined surface that extends downwardly from a horizontal plane, and edges of end faces of the concave-convex portions and boundaries between a horizontal plane of the base plate and the inclined surfaces of the concave-convex portions are round chamfered.

2. The paper-sheet recognition apparatus according to claim 1, further comprising first and second guides for transporting the paper sheet that are respectively engaged in front and rear end faces of the base plate which are perpendicular to the transport direction, wherein engaging portion between the front end surface of the base plate and the first guide has a concave-convex engaging structure in which a concave-convex portion provided in the front end face of the base plate and a concave-convex portion provided in end face of the first guide are engaged with each other, and engaging portion between the rear end face of the base plate and the second guide has a concave-convex engaging structure in which a concave-convex portion provided in the rear end face of the base plate and a concave-convex portion provided in end face of the second guide are engaged with each other, convex portions of the concave-convex portions provided in the base plate have the same size as convex portions of the concave-convex portions provided in the first and second guides in the direction perpendicular to the paper-sheet transport direction, each of the concave-convex portions is formed having an inclined surface that extends in the transport direction and downwardly with respect to a transport surface, and edges of end faces of the concave-convex portions and boundaries between the horizontal plane and the inclined surfaces of the concave-convex portions are round chamfered.

3. The paper-sheet recognition apparatus according to claim 2, further comprising claws each having a predetermined inclined surface that extends in the transport direction and is inclined with respect to the horizontal plane with a predetermined pitch in opposite side of the concave-convex portion of at least one of the first and second guides which are provided in the front and the rear end faces of the base plate perpendicular to the transport direction.

4. The paper-sheet recognition apparatus according to claim 1, further comprising:

a point sensor engaged in the base plate; and a cover of the point sensor of which end portion is formed into a truncated conical shape, wherein a diameter of a rim of a hole formed in the base plate side in which the cover of the point sensor is fitted is made smaller than a diameter of the cover of the point sensor.

5. The paper-sheet recognition apparatus according to claim 4, wherein an upper surface of the rim of the hole formed in the base plate, which faces to a transport path of the paper sheet and by which the sensor cover is caught, is formed having an round chamfered portion.

6. The paper-sheet recognition apparatus according to claim 1, wherein a pitch distance between the convex portions of the concave-convex portion is from 5 mm to 10 mm.

7. The paper-sheet recognition apparatus according to claim 1, wherein a length of the convex portion of the concave-convex portion in the transport direction is from 2 mm to 5 mm.

8. The paper-sheet recognition apparatus according to claim 1, wherein an angle of the inclined surface of the concave-convex portion relative to the horizontal plane is from 5 degrees to 20 degrees.

* * * * *